United States Patent [19]
Tocci

[11] Patent Number: 5,247,183
[45] Date of Patent: Sep. 21, 1993

[54] CRYOGENIC SIGNAL COUPLER HAVING IMAGING LENS WITHIN A THERMAL BARRIER REGION FOR OPTOELECTRONIC COUPLING

[75] Inventor: Christopher S. Tocci, N. Brookfield, Mass.

[73] Assignee: Raytheon Company, Lexington, Mass.

[21] Appl. No.: 793,780

[22] Filed: Nov. 18, 1991

[51] Int. Cl.$^5$ .............................................. G02B 27/00
[52] U.S. Cl. .................................. 250/551; 250/238; 250/332
[58] Field of Search ............... 250/238, 551, 306, 330, 250/343, 332, 352, 349

[56] References Cited
U.S. PATENT DOCUMENTS
4,810,978 3/1989 Sato et al. ........................ 250/332

Primary Examiner—David C. Nelms
Assistant Examiner—T. Davenport
Attorney, Agent, or Firm—Walter F. Dawson; Richard M. Sharkansky

[57] ABSTRACT

A cryogenic signal coupling apparatus includes a laser which launches optical power into an integrated optical waveguide (IOW) within a cryogenic region via an imaging lens. This optical power is then equally split by a passive optical splitter, and fed to one or more 1×2 IOW devices. Within the cryogenic region, a plurality of infrared sensing photodiodes provide electrical signal outputs in response to optical stimuli, which signal outputs are amplified and selected by a multiplexing arrangement for application as the modulating signal to one of the 1×2 IOW's. Control electronics also within the cryogenic region supply timing and control information to the other electronics therein. The IOW's modulate their input optical power in accordance with their respective modulating electrical input signals, and provide differential optical outputs which are directed across the thermal barrier to individual differential optical receivers. In one embodiment, the electrical signal from the light sensors is selected by an electrical multiplexer for application as the modulating signal to a single optical modulator, while in a second embodiment, there is disclosed an optical modulator associated with each light sensor, and the source light power to be modulated is selectively switched to only one modulator by an optical multiplexing arrangement.

14 Claims, 5 Drawing Sheets

CRYOGENIC SIGNAL COUPLER HAVING IMAGING LENS WITHIN A THERMAL BARRIER REGION FOR OPTOELECTRONIC COUPLING

BACKGROUND OF THE INVENTION

This invention relates generally to sensing systems utilizing cryogenic cooling and, more particularly, to an apparatus for transferring electrical signals out of a cryogenically cooled region to a signal processing unit at ambient temperature.

Optical detecting systems for sensing infrared radiation employ sensors which operate at optimal performance levels at cryogenic temperatures. As examples, mercury cadmium telluride photodiodes are usually maintained at 77° K., while copper-doped germanium devices are normally operated at 4° K. The sensing devices and their support electronics are typically housed in a cryostatically pumped Dewar in order to maintain these low temperatures.

Current sensing systems, as may be employed in a satellite system which scans portions of the heavens for infrared radiation, may include arrays having literally millions of photodiode sensors, thereby introducing a significant problem o coupling information between the sensors and their immediate support electronics, operating in a cryogenic region, and the data processing electronics, operating at a much higher temperature. The temperature gradient creates thermal and mechanical stresses upon any element physically coupling the two regions.

Cryogenic signal handling techniques in current use often compromise the sensor's front-end in terms of electrical performance, cost and physical space consumed. The primary functions involved in any infrared staring or scanning sensor are signal acquisition, transduction, routing and processing. Each piece of raw data, whether discrete analog pixels or continuous, must be carefully handled and communicated to other points.

The degree by which a sensor system performs its primary functions can be measured in terms of noise generation, channel-to-channel crosstalk, power dissipation, physical size and weight, and environmental robustness. Cryogenically cooled sensors have the additional problem that they must be operated at very low temperatures while retaining an optimally balanced performance as determined by these operational standards.

When employing conventional electronic devices, typically CMOS, to process the sensor information, channel-to-channel crosstalk in the electronics partially negates the noise reduction benefits afforded by cooling the sensor's front-end. Heat generation from the CMOS further aggravates the sensor's noise generation at the front-end. This puts an added load on the sensor's cryostat by increasing its size, weight and operating power requirements. Additionally, conventional electronic devices are known to have gain and DC operating point instabilities at temperatures in the 77° K. region. Finally, the space available is generally at a premium on the cryogenic front-end and any reduction in componentry reaps an operational advantage.

The primary problems associated with conventional CMOS signal handling in the cryogenic region include electronically generated heat which raises the sensor's noise floor, compromised performance of CMOS circuitry due to cryogenically induced gain and DC instabilities, electromagnetic interference between the low level photodiode output signals and supporting electronic control signals, and channel-to-channel crosstalk due to individual channel leakage and multiplexing control signals. These final two problems contribute significantly to a lowering of the effective signal-to-noise ratio for any given sensor channel beyond the infrared transduction noise.

Another common problem with conventional multiplexing of mercury cadmium telluride diode signals is the increased switching speeds required with a large number of channels. These increased switching speeds increase crosstalk among channels and require increasingly smaller sampling times to allow for transient settling at the end of the cascaded multiplexer chain. This puts design pressure on the A/D conversion which follows the sensor stage and on the and signal processing requirements for real-time systems.

Since the early 1980's, the industry has studied CMOS technology operating at cryogenic temperatures to process focal plane array data before the signal-to-noise ratio could be corrupted. It has been found that the operation of CMOS devices at liquid nitrogen temperatures produces "freezout" effects in depletion and enhancement-mode CMOS devices. One such "freezout" effect is a cryogenically stressed device degradation referred to as hot-electron device degradation, which creates transistor threshold changes and greatly diminished transconductance. Together, these degradations create instabilities in gain and DC levels.

Another problem associated with cryogenic operation is increased interconnection resistance among devices that are fabricated at submicron scale. This phenomenon creates signal bandwidth limitations.

Finally, a physical interconnection between the cryogenic and noncryogenic regions introduces a thermal leakage path when electrical connections are anchored to a backplane. This supplies additional heat to the sensor and necessitates greater cryostat pumping capability.

SUMMARY OF THE INVENTION

It is therefore an object of the present invention to provide an improved optical sensing system utilizing cryogenic cooling.

It is a further object of the present invention to provide means in a cryogenically cooled, optical sensing system for coupling electrical signals from the cryogenic region to an ambient temperature region.

It is an additional object of the present invention to provide means in a cryogenically cooled, optical sensing system for coupling electrical signals from the cryogenic region to an ambient temperature region, wherein the amount of electrical circuitry within the cryogenic region is minimized.

It is a still further object of the present invention to provide an integrated optical waveguide device which provides switching of incident optical power and modulation of the switched light power.

In accordance with the principles of the present invention, there is disclosed an apparatus for use in a system having a first region at a first temperature separated from a second region at a second temperature substantially lower than the first region. The apparatus is for coupling information from the second region to the first region. The apparatus comprises means for coupling optical power from the first region to the second region, means in the second region for modulating the optical power coupled from the first region, and means for coupling the modulated optical power from the second region to the first region.

In one embodiment of the present invention, there is disclosed an integrated optical waveguide device. The device comprises light steering means including integrated optical waveguides on a substrate. The light steering means is responsive to an electrical signal for steering incident optical power either along a predetermined waveguide or into the substrate. The device also comprises means including integrated optical waveguides on the substrate responsive to an electrical signal for modulating the light power received on the predetermined waveguide.

With this arrangement, an apparatus is provided for coupling electrical signals from a cryogenic region to an ambient temperature region, wherein the amount of electrical circuitry within the cryogenic region is minimized, thereby easing the burden on the cooling system while reducing the costs associated with electrical circuitry capable of operation at cryogenic temperatures, and enhancing the reliability of the overall system.

BRIEF DESCRIPTION OF THE DRAWINGS

Other features and advantages of the present invention will be more fully understood from the following detailed description of the preferred embodiments, the appended claims, and the accompanying drawings, in which:

DESCRIPTION OF THE PREFERRED EMBODIMENT

A cryogenic signal coupling apparatus, as described herein, includes a continuous wave (CW) integrated laser which launches optical power into an integrated optical waveguide (IOW) within a cryogenic region via an imaging lens. This optical power is then equally split by a passive optical splitter, and fed to two 1×2 IOW devices. Within the cryogenic region, a plurality of infrared sensing photodiodes provide electrical signal outputs in response to optical stimuli, which signal outputs are amplified and selected by a multiplexing arrangement for application as the modulating signal to one of the two 1×2 IOW's. Control electronics also within the cryogenic region supply timing and control information to the other electronics therein, and also apply a modulating signal to the other of the 1×2 IOW's. The IOW's modulate their input optical power in accordance with their respective modulating electrical input signals, and provide differential optical outputs which are directed across the thermal barrier to individual differential optical receivers.

In the practice of this invention, the preferred structure for transmitting photonic power from one optical device to another within a single temperature region is via integrated optical waveguides. However, it will be recognized that the principles taught herein also apply equally to bulk optical waveguides, such as fiber optic cable.

The architecture described herein proposes the use of titanium doping to form an integrated optical waveguide on a lithium niobate substrate (Ti:LiNbO$_3$) for coupling analog and/or digital signals out of the cryogenic region to increase signal handling performance. Devices made of these materials offer a wide bandwidth, low noise and high dynamic range multiplexer for transmitting information out of the region. IOW devices of this type are well known, and are sold by, for example, Crystal Technology, Inc., of Palo Alto, Calif.

Figure 1:
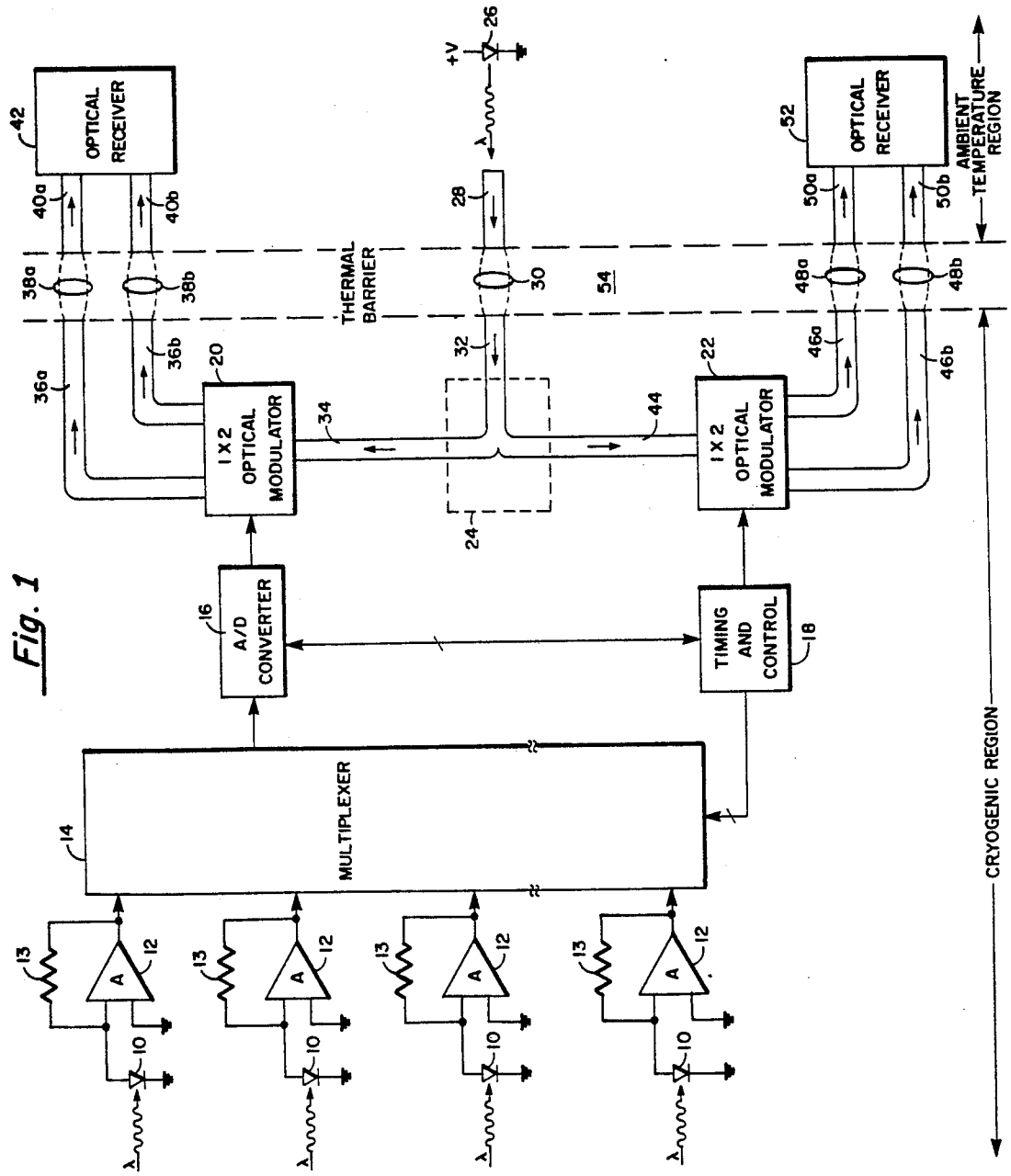
FIG. 1 is a block and schematic diagram of a cryogenic electro-optical signal coupling apparatus according to a first embodiment of the present invention.

Referring to FIG. 1, there is shown a diagram, partly in schematic and partly in block form, of a first embodiment of the present invention. The apparatus of FIG. 1 includes a cryogenic region, illustratively at 77° K., and an ambient temperature region, the two regions being spaced from one another by a thermal barrier 54.

Within the cryogenic region of the FIG. 1 apparatus, a plurality of photodiodes 10 are responsive to sources of infrared light power (not shown). Photodiodes 10, which may illustratively comprise mercury cadmium telluride (HgCdTe) diodes, couple infrared sensor signals individually to amplifiers 12, which typically are transimpedance amplifiers. Amplifiers 12 may comprise an integrated circuit, or they may comprise discrete components, depending on the size, bandwidth, power and noise requirements. Amplifiers 12 typically include a gain setting resistor 13 coupled between the amplifier output and input terminals, to set the gain of the amplifier. Resistor 13 may comprise a metal, thin-film resistor for low thermal noise.

The output ports of amplifiers 12 are all coupled as input signals to multiplexer 14 which, under the control of its addressing inputs, selects one of the plurality of analog sensor signals to be applied at its output terminal. The output signal from multiplexer 14 may be coupled through analog-to-digital (A/D) converter 16, which converts the analog input signal to a digital pulse train providing a digital representation of the analog input signal. The digital output signal from converter 16 is coupled as the modulating signal to 1×2 optical modulator 20. In an alternative configuration, the output analog signal from multiplexer 14 is coupled directly as the modulating signal to modulator 20. A detailed description of the function and configuration of optical modulator is provided in relation to FIG. 2.

The depiction in FIG. 1 of multiplexer 14 as a simple multiple-input, single-output device should be considered merely as representative of a potentially far more complex device providing, however, the same function as shown. It will be recognized by those knowledgeable in the art to which it pertains, that infrared sensing systems typically include a great multiplicity of individual sensors, and that a multiplexing arrangement, in which individual sensor outputs are selected from the corresponding great multiplicity of sensor outputs, must ideally entail a corporate structure including tiers of multiplexers feeding other multiplexers, thereby providing the required function using a minimal amount of hardware. It will be considered well within the capability of those of skill in the art to devise such an arrangement in those cases where the number of sensors so dictates.

A timing and control module 18 provides input channel select addressing data to multiplexer 14 and exchanges timing and control signals with A/D converter 16. Since module 18 generates a timing signal within the cryogenic region, it clearly includes an oscillator as well as logic circuitry required to perform the described functions. Additionally, timing and control module 18 applies a digital timing signal as the modulating signal to 1×2 optical modulator 22, which, in the disclosed embodiment, may be substantially identical to modulator 20.

On the other side of thermal barrier 54, in the ambient temperature region, optical power source 26, shown in the present example as a semiconductor laser, couples optical power into optical waveguide 28, which conducts the light to edge of thermal barrier 54 where it radiates into the free space of the barrier region. Lens 30, shown in the present example as being a double convex type within thermal barrier 54, collects the dispersing light beam from waveguide 28 and focuses it toward optical waveguide 32 at the edge of thermal barrier 54 within the cryogenic region. Waveguide 32 conducts the light beam into passive beam splitter 24, which divides the light beam substantially equally into optical waveguides 34 and 44.

Optical modulator 20 receives the light input from waveguide 34 and, in response to the digital voltage level of the modulating input signal from A/D converter 16, couples the light through to either waveguide 36a or waveguide 36b. For the case where there is no A/D converter and the analog signal from multiplexer 14 provides the modulating signal directly to optical modulator 20, the light from waveguide 34 may be differentially divided between waveguides 36a and 36b, depending on the instantaneous level of the modulating signal. However, this case results in a greatly reduced signal dynamic range and reduced signal-to-noise ratio (SNR) of the infra-red sensor signals.

Waveguides 36a and 36b conduct light to thermal barrier 54 where it radiates into the barrier region. Lenses 38a and 38b, each shown in the present example as being a double convex type within thermal barrier 54, collect the dispersing light beams from waveguides 36a and 36b, respectively, and focus them toward optical waveguides 40a and 40b, respectively, at the edge of thermal barrier 54 within the ambient temperature region. Waveguides 40a and 40b conduct their light beams to optical receiver 42, which converts the differential optical signals thereon into an electrical signal.

Optical modulator 2 receives the light input from waveguide 44 and, in response to the digital voltage level of the modulating input signal from timing and control module 18, couples the light through to either waveguide 46a or waveguide 46b. Waveguides 46a and 46b conduct light to thermal barrier 54 where it radiates into the barrier unguided (free space) region. Lenses 48a and 48b, each shown in the present example as being a double convex type within thermal barrier 54, collect the dispersing light beams from waveguides 46a and 46b, respectively, and focus them toward optical waveguides 50a and 50b, respectively, at the edge of thermal barrier 54 within the ambient temperature region. Waveguides 50a and 50b conduct their light beams to optical receiver 52, which converts the differential optical signals thereon into an electrical signal.

Although lenses 30, 38a, 38b, 48a and 48b are all shown as being within thermal barrier 54, it will be recognized that any or all of them may alternatively be positioned on either side of barrier 54.

Figure 2:
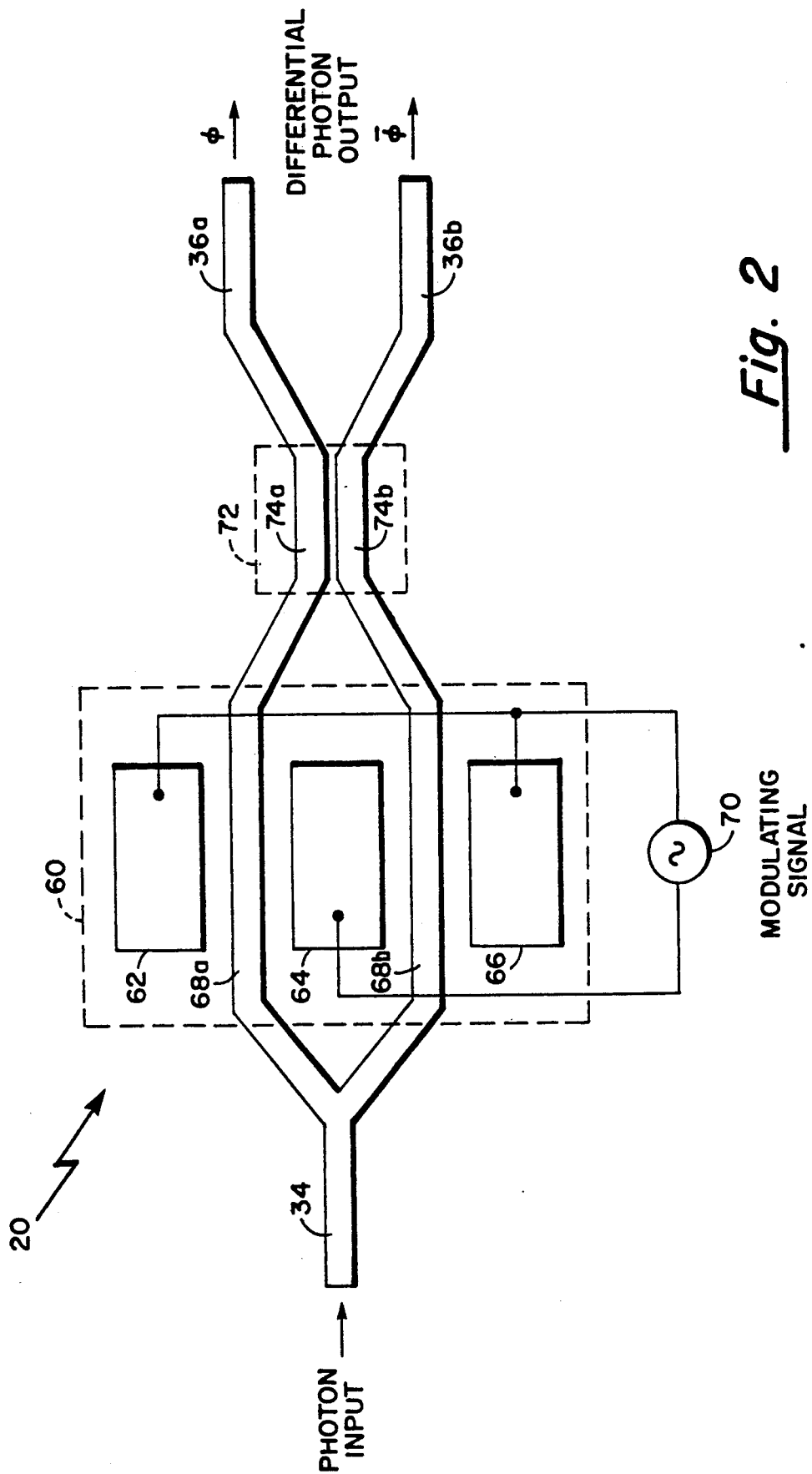
FIG. 2 illustrates, in greater detail, the integrated optical waveguide modulator of the apparatus of FIG. 1.

Referring now to FIG. 2, there is shown a more detailed sketch of the optical power modulator 20 of the apparatus of FIG. 1, which may also be structurally identical to optical modulator 22. Modulator 20 comprises sections of optical waveguide 34, 68a, 68b, 74a, 74b, 36a and 36b, which are configured relative to each other and electrodes 62, 64 and 66, so as to enable steering of photonic power at the input section of modulator 20 selectively between the two output sections $\phi$ and $\bar{\phi}$. The depictions of the waveguide sections and electrodes of FIG. 2 are intended for use in understanding the function of device 20, and no representations of actual physical dimensions or spacings are intended thereby.

Optical waveguide section 34 splits into a waveguide "Y" which then continues as two substantially parallel waveguide sections 68a and 68b within modulating section 60. Waveguide section 68a passes between electrodes 62 and 64, and waveguide section 68b passes between electrodes 64 and 66. A modulating signal source 70 is coupled at one port to electrode 64 and at its other port to electrodes 62 and 66, such that an electric field induced through waveguide 68a will be equal in magnitude and opposite in direction to an electric field induced through waveguide section 68b. Electrodes 62, 64 and 66 are typically fabricated of a metallization deposition and may illustratively comprise titanium.

As waveguide sections 68a and 68b emerge from modulating section 60, they approach one another very closely as waveguide sections 74a and 74b, respectively, within evanescent coupler 72. Waveguide sections 74a and 74b then diverge from one another as waveguide sections 36a and 36b, respectively. It should be noted that from the point where waveguide section 34 diverges into a "Y" to the point where waveguide sections 74a and 74b diverge from one another, the lengths of each of the opposing waveguide sections are equal.

In the operation of the modulator 20 of FIG. 2, an input light beam in waveguide section 34 is split into two beams which travel along waveguide sections 68a and 68b. In the absence of any electric field produced by modulating signal source 70, i.e., the modulating signal is at 0 v, the split beams from sections 68a and 68b will interfere constructively in evanescent coupler 72, and equal optical power will appear at both of the outputs of waveguide sections 36a and 36b.

However, when there is a non-zero voltage on the modulating signal, electric fields will be induced through waveguide sections 68a and 68b, in such direction as is determined by the polarity of the modulating signal. The presence of a field will tend to compress or expand the wavelength of the optical signal within the waveguide section, depending on the direction of the field. In this case, the split beams from sections 68a and 68b will interfere destructively in evanescent coupler 72, radiating light power out of section 74a and into section 74b in response to a first direction of the electric field, and radiating out of section 74b and into section 74a in response to a second direction of the electric field. Thus, in this case, the optical power appearing at the outputs of waveguide sections 36a and 36b will be differentially divided, in accordance with the magnitude and polarity of the modulating signal from source 70.

Figure 3:
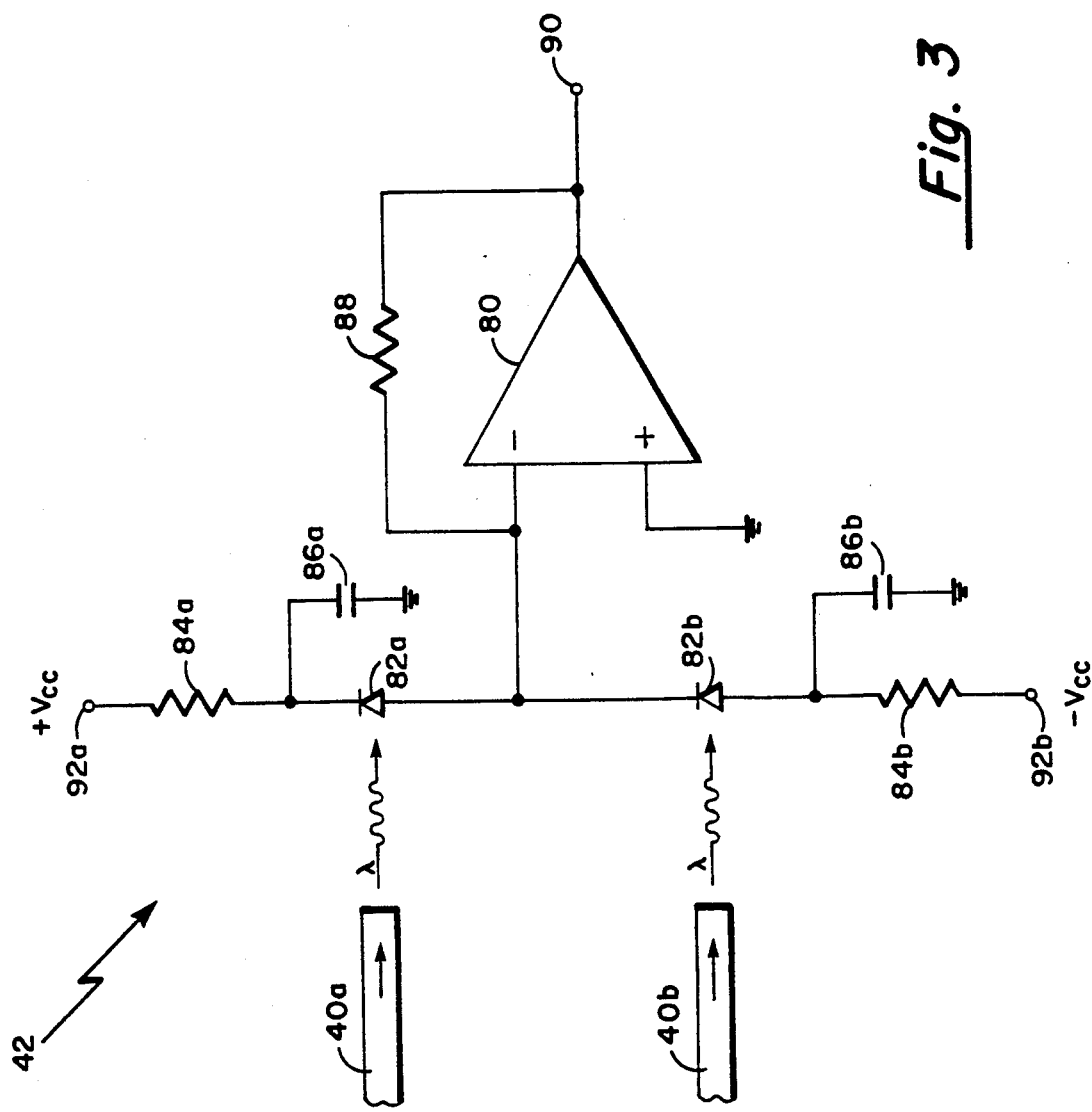
FIG. 3 illustrates, in greater detail, the optical receiver of the apparatus of FIG. 1

Referring now to FIG. 3, there is shown a more detailed schematic diagram of optical receiver 42 of the FIG. 1 embodiment, which may also be structurally identical to optical receiver 52. Receiver 42 is typically a transimpedance-type, optical-to-electrical converter, and comprises an operational amplifier 80 having an input network comprising photodiodes 82a and 82b, resistors 84a and 84b, and capacitors 86a and 86b, and having also a feedback resistance 88. Receiver 42 is responsive to differential optical signals on waveguides 40a and 40b for providing a single-ended electrical signal on output terminal 90. Operational amplifier 80 may be an integrated circuit device or it may comprise discrete components, depending on size and performance constraints.

The input network coupled to the (−) input port of amplifier 80 includes the series connection of resistor 84a, photodiode 82b, photodiode 82b and resistor 84b, coupled between positive and negative sources of equal magnitude bias voltages, +Vcc and −Vcc, applied, respectively, to terminals 92a and 92b. Photodiodes 82a and 82b are poled so as to conduct current in the presence of photonic power applied thereto, and to block current flowing from the positive voltage source at terminal 92a to the negative voltage source at 92b in the absence of light power. Capacitor 96a, coupled between the resistor 84a-photodiode 82a juncture and ground, and capacitor 86b, coupled between the resistor 84b-photodiode 82b juncture, serve as low pass filters to remove ripple from the dc bias and prevent it from reaching the low-level signal. The input network is coupled to the (−) input port of amplifier 80 at the series connection of the anode of photodiode 82a and the cathode of photodiode 82b.

Photodiodes 82a and 82b are positioned adjacent optical waveguides 40a and 40b, respectively, such that light power emerging from waveguides 40a, 40b is coupled to the light sensitive areas of the respective photodiodes 82a, 82b. As mentioned earlier in regard to FIGS. 1 and 2, optical waveguides 40a and 40b are differentially driven, so that only one will be carrying optical power at a time. Thus, when optical power is delivered only from waveguide 40a into photodiode 82a, the voltage at the (−) input port of amplifier 80 will be positive, and correspondingly, when optical power is delivered only from waveguide 40b into photodiode 82b, the voltage at the (−) input port of amplifier 80 will be negative.

Thus it is seen that for the (+) input port of amplifier 80 coupled to ground potential, amplifier 80 will be differentially driven in response to the relative light intensities appearing on optical waveguides 40a and 40b. Feedback resistor 88, coupled between the output port and the (−) input port of amplifier 80 functions as a gain setting resistor.

Figure 4:
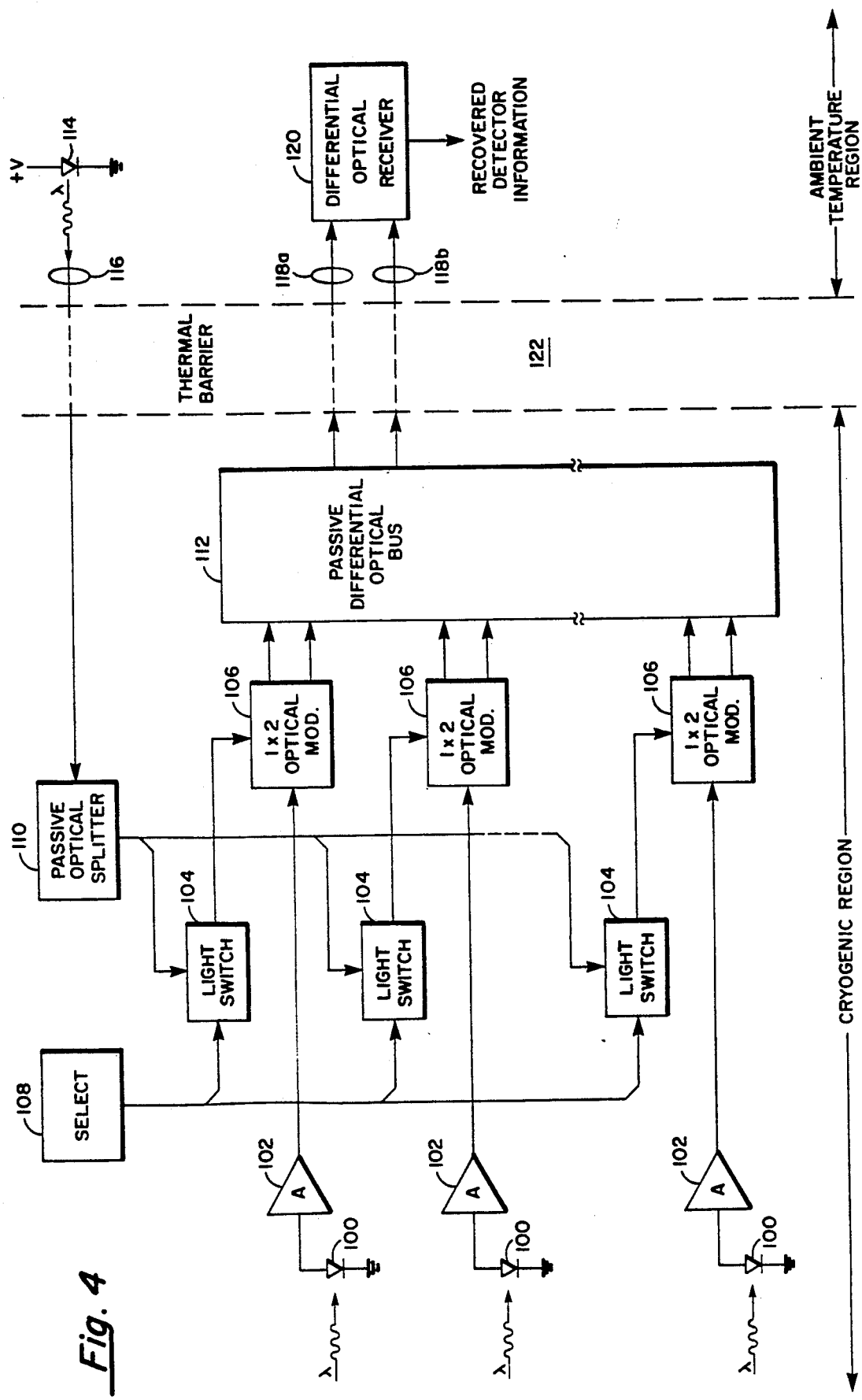
FIG. 4 is a block and schematic diagram of a cryogenic electro-optical signal coupling apparatus according to a second embodiment of the present invention.

Referring now to FIG. 4, there is disclosed a second embodiment according the principles of the present invention. Whereas, in the embodiment of FIG. 1, the electrical signal from the light sensors is selected by an electrical multiplexer for application as the modulating signal to a single optical modulator, the apparatus of FIG. 4 includes optical multiplexing. Each light sensor has associated with it an individual optical modulator, and the source light power to be modulated is selectively switched to only one modulator.

As in the apparatus disclosed in FIG. 1, the preferred structure in the FIG. 4 embodiment for transmitting photonic power from one optical device to another within a single temperature region is via integrated optical waveguides. However, it will be recognized that the principles taught herein also apply equally to bulk optical waveguides.

The apparatus of FIG. 4 includes a cryogenic region, illustratively at 77° K., and an ambient temperature region, the two regions being spaced from one another by a thermal barrier 122. Within the cryogenic region, a plurality of photodiodes 100 are responsive to individual sources of infrared light power (not shown). Photodiodes 100, which may illustratively comprise mercury cadmium telluride (HgCdTe) diodes, couple infrared sensor signals individually to amplifiers 102, which typically are transimpedance amplifiers. Amplifiers 102 may comprise integrated circuits, or they may include discrete components, depending on the size, bandwidth, power and noise requirements. Each amplifier 102 is coupled at its output port to the modulating input of a 1×2 integrated optical waveguide modulator 106.

On the other side of thermal barrier 122, in the ambient temperature region, optical power source 114, shown in the present example as a semiconductor laser, couples optical power through lens 116 and through thermal barrier 122, into passive optical splitter 110 in the cryogenic region. It should be recognized that all optical paths within the apparatus of FIG. 4 comprise optical waveguides which, in a preferred configuration, comprise integrated optical waveguides, but which may also comprise bulk optical waveguides such as fiber optic cables. Lens 116, shown in the present example as being a double convex type on the ambient temperature side of thermal barrier 54, collects the naturally dispersing light beam from source 114 and focuses it toward passive optical splitter 110. Passive optical splitter 110 divides the input light beam into a plurality of substantially equal output beams, which are individually applied a the light inputs to the plurality of light switches 104.

Light switch 104 is an optical device which selectively enables or blocks the passage of light therethrough, in response to an applied electrical signal. The preferred embodiment of light switch 104 is shown in greater detail in FIG. 5. Electrical select device 108 applies enabling voltages to the plurality of light switches 104 such that only one light switch 104 is selected at any one time to enable optical power therethrough. Select device 108 may typically include a counter/decoder so as to provide individual electrical enabling signals to light switches 104 which would be operated sequentially. Alternatively, select device 108 may including addressing means for selecting light switches 104 in a random manner. The waveguide carrying the light output from each light switch 104 is coupled to a corresponding 1×2 integrated optical waveguide modulator 106. The preferred embodiment of optical modulator 106 is shown in greater detail in FIG. 5.

Each optical modulator 106 receives the light input from its corresponding light switch 104 and, in response to the modulating signal applied from its corresponding amplifier 102, provides a pair of differentially divided light outputs to passive differential optical bus 112. Bus 112 typically comprises integrated optical waveguides coupling all of the first differential outputs from optical modulators 106 into a first path, and coupling all of the second differential outputs from optical modulators 106 into a second path. Bus 112 comprises multimode pathwidths which are at least five times, and preferably ten times, the wavelength of the light signal, to eliminate diffractive effects.

Bus 112 conducts light from the first and second paths to thermal barrier 122 where it radiates into the barrier region. Lenses 118a and 118b, each shown in the present example as being a double convex type on the ambient temperature side of thermal barrier 122, collect the dispersing light beams from passive differential optical bus 112 and focus them toward optical receiver 120, which converts the differential optical signals thereon into an electrical signal. Differential optical receiver 120 is preferably similar to optical receiver 42, which is described in detail in relation to FIG. 3.

Although lenses 116, 118a and 118b are all shown as being on the ambient temperature side of thermal barrier 122, it will be recognized that any or all of them may alternatively be positioned within or on the opposite side of barrier 122.

Figure 5:
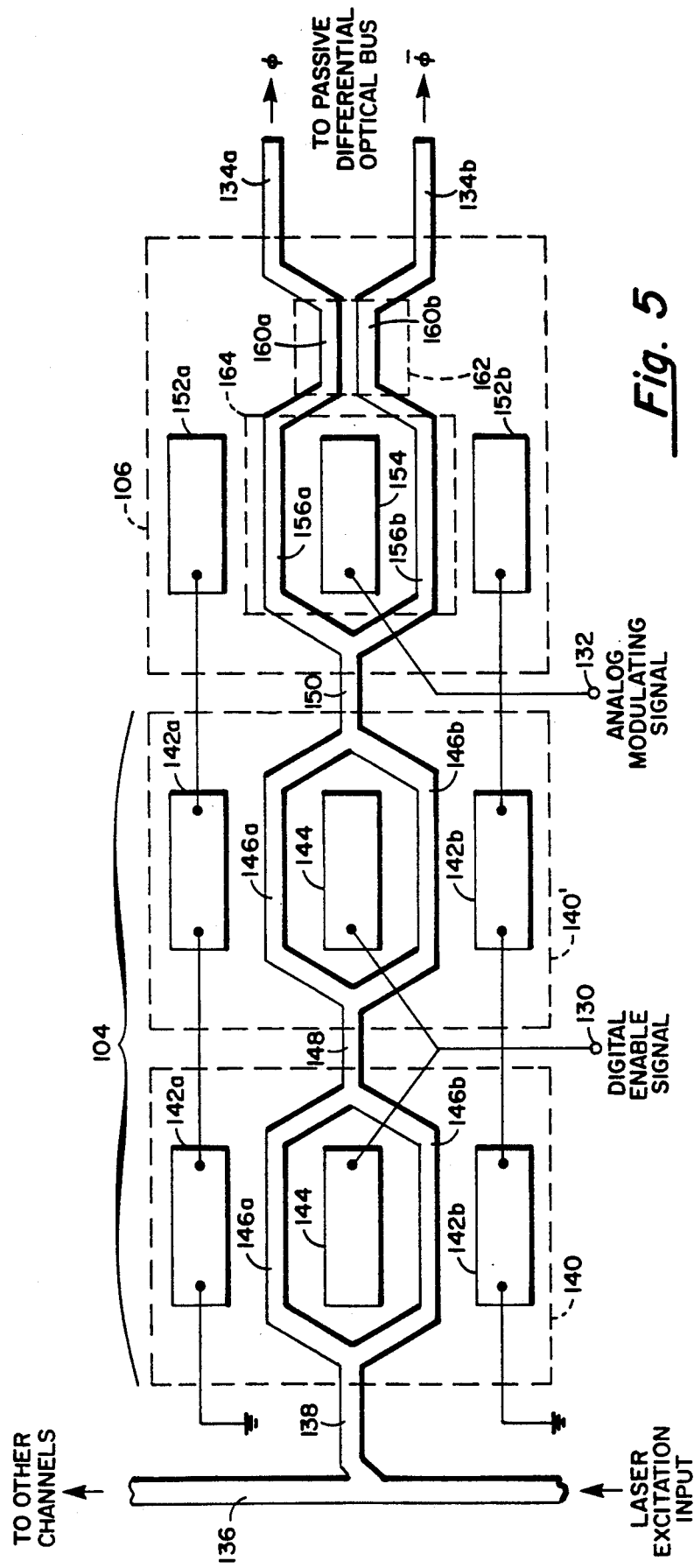
FIG. 5 illustrates, in greater detail, the integrated optical waveguide switch and modulator of the apparatus of FIG. 4.

Referring now to FIG. 5, there is shown the integrated optical waveguide switch 104 and modulator 106 of the apparatus of FIG. 4 in greater detail. Like the FIG. 2 representation, no attempt has been made to depict the waveguide elements of FIG. 5 in accurate scale. Switch 104 comprises, in the illustrated embodiment, two Mach-Zehnder interferometers 140 and 140' in cascade configuration. Although a single Mach-Zehnder interferometer 140 is sufficient to provide light switching for many applications, two such devices have been shown in this example to ensure a very high level of light isolation. Modulator 106 may be substantially identical to 1×2 integrated optical waveguide modulator 20 of the FIG. 2 embodiment.

Optical power received from laser 114 (shown in FIG. 4) is applied to passive optical splitter 110 (shown in FIG. 4), a portion of which is represented in FIG. 5 as integrated optical waveguide 136. A fraction of the optical power is split off into waveguide section 138 and the remainder continues along waveguide section 136 to feed other channels (not shown).

Optical waveguide section 138 splits into a waveguide "Y" which then continues as two substantially parallel waveguide sections 146a and 146b within a first Mach-Zehnder interferometer 140. Waveguide section 146a passes between electrodes 142a and 144, and waveguide section 146b passes between electrodes 144 and 142b. Electrodes 142a, 142b and 144 are typically fabricated of a metallization deposition and may illustratively comprise titanium. A digital enable signal, applied at terminal 130, is coupled to electrode 144, while electrodes 142a and 142b are both maintained at a reference dc potential, illustratively ground.

As waveguide sections 146a and 146b emerge from the first Mach-Zehnder interferometer 140, they come together in a "Y" connection as waveguide section 148. It should be noted that from the point where waveguide section 138 diverges into a "Y" to the point where waveguide sections 146a and 146b come together at waveguide section 148, the lengths of each of the opposing waveguide sections are equal.

In the illustrated embodiment, switch 104 comprises two Mach-Zehnder interferometers 140 and 140'. In this example, the two interferometers 140, 140' are substantially identical, and are coupled in cascade configuration. That is, waveguide section 148, the output section from the first interferometer 140 comprises the input waveguide section to the second interferometer 140'.

In the operation of the interferometer 140 of FIG. 5, an input light beam in waveguide section 138 is split into two beams which travel along waveguide sections 146a and 146b. In the absence of any electric field produced by the digital enable signal applied at terminal 130, and coupled between electrodes 144 and 142a, 142b, i.e., the enabling signal is at 0 v (the enabling condition for light transmission therethrough), the split beams from sections 146a and 146b will interfere constructively when the waveguides rejoin at waveguide section 148, and virtually all of the optical power will be transmitted through section 148.

However, when there is a non-zero voltage on the digital enabling signal (the blocking condition for light through interferometer 140), electric fields will be induced through waveguide sections 146a and 146b, in such direction as is determined by the polarity of the enabling signal. The presence of a field will tend to compress or expand the wavelength of the optical signal within the waveguide section, depending on the direction of the field. In this case, for a sufficient voltage difference between electrodes 144 and 142a, 142b, illustratively 5v, the split beams from sections 146a and 146b will interfere destructively when they rejoin at waveguide section 148, radiating virtually all of the light power out of section 148 and into the substrate. However for the small amount of light which passes out of the first interferometer 140 on waveguide section 148, the second interferometer 140' provides the same level of light attenuation as the previous stage, resulting in essentially complete isolation of light between waveguide sections 138 and 150.

Optical waveguide section 150, transmitting the light output from interferometer 140', form the input waveguide section for modulator 106. Waveguide section 150 splits into a waveguide "Y" which then continues as two substantially parallel waveguide sections 156a and 156b within modulating section 164. Waveguide section 156a passes between electrodes 152a and 154, and waveguide section 156b passes between electrodes 154 and 152b. Electrodes 152a, 152b and 154 are typically fabricated of a metallization deposition and are illustratively comprise titanium.

An analog modulating signal, applied at terminal 132, is coupled to electrode 154, and electrodes 152a and 152b are coupled to a reference potential, illustratively ground, such that an electric field induced through waveguide 156a will be equal in magnitude and opposite in direction to a electric field induced through waveguide section 156b.

As waveguide sections 156a and 156b emerge from modulating section 164, they approach one another very closely as waveguide sections 160a and 160b, respectively, within evanescent coupler 162. Waveguide sections 160a and 160b then diverge from one another as waveguide sections 134a and 134b, respectively. It should be noted that from the point where waveguide section 150 diverges into a "Y" to the point where waveguide sections 160a and 160b diverge from one another, the lengths of each of the opposing waveguide sections are equal.

In the operation of the modulator 106 of FIG. 5, an input light beam in waveguide section 150 is split into two beams which travel along waveguide sections 156a and 156b. In the absence of an electric field produced by the modulating signal applied at terminal 132, i.e., the modulating signal is at 0 v, the split beams from sections 156a and 156b will interfere constructively in evanescent coupler 162, and equal optical power will appear at both of the outputs of waveguide sections 134a and 134b.

However, when there is a non-zero voltage on the modulating signal, electric fields will be induced through waveguide sections 156a and 156b, in such direction as is determined by the polarity of the modulating signal. The presence of a field will tend to compress or expand the wavelength of the optical signal within the waveguide section, depending on the direction of the field. In this case, the split beams from sections 156a and 156b will interfere destructively in evanescent coupler 162, radiating light power out of section 160a and into section 160b in response to a first direction of the electric field, and radiating out of section 160b and into section 160a in response to a second direction of the electric field. Thus, in this case, the optical power appearing at the outputs of waveguide sections 134a and 134b will be differentially divided, in accordance with the magnitude and polarity of the analog modulating signal at terminal 132.

Thus, it is seen that the device of FIG. 5 comprises an integrated optical waveguide device, formed on a single substrate, which provides exceeding high-isolation light switching and light modulation in response to electrical input signals.

While the principles of the present invention have been demonstrated with particular regard to the illustrated structure of the figures, it will be recognized that various departures may be undertaken in the practice of the invention. The scope of this invention is not intended to be limited to the particular structure disclosed herein, but should instead be gauged by the breadth of the claims which follow.

What is claimed is:

1. An apparatus for use in a system having a first region at a first temperature separated from a second region at a second temperature substantially lower than said first temperature, said apparatus for coupling information from said second region to said first region, said apparatus comprising:
   thermal barrier means for separating said first temperature region and said second temperature region;
   first imaging lens means within said barrier means for coupling optical power from said first region into said second region;
   means in said second region for modulating said optical power coupled from said first region; and
   second imaging lens means within said barrier means for coupling said modulated optical power from said second region to said first region, said modulated optical power comprises said information.

2. The apparatus according to claim 1 wherein said modulating means is responsive to an infrared sensor signal.

3. The apparatus according to claim 1 wherein said first-mentioned coupling means and said second-mentioned coupling means include integrated optical waveguides.

4. The apparatus according to claim 1 wherein said modulating means provides a pair of differentially divided optical outputs.

5. The apparatus according to claim 1 wherein said modulating means includes integrated optical waveguides.

6. The apparatus in accordance with claim 1 wherein said first temperature is an ambient temperature and wherein said second temperature results from cryogenic cooling.

7. An optical detection system comprising:
   a plurality of sensors, each of said sensors providing at an output terminal thereof an analog signal indicative of detected optical radiation;
   electrical multiplexing means having input terminals coupled to said sensor output terminals for selectively applying one of said sensor signals to an output terminal thereof;
   means coupled to said multiplexing means output terminal for converting said selected sensors signals from an analog signal to a digital signal, said converting means providing improved dynamic range and signal-to-noise figures of merit of said sensor signals;
   means responsive to the sensor digital signal at the output terminal of said converting means for modulating optical power,
   said sensors, said multiplexing means, said converting means and said modulating means all being housed within a cryogenically cooled region;
   source means in ambient temperature region for providing optical power;
   detector means in said ambient temperature region for generating an electrical signal indicative of detected optical power;
   thermal barrier means intermediate said cryogenic temperature region and said ambient temperature region for focusing said optical power transversing said thermal barrier means;
   first imaging lens means within said barrier means for coupling said optical power from said source means to said modulating means; and
   second imaging lens means within said barrier means for coupling modulated optical power from said modulating means to said detector means.

8. The optical detection system in accordance with claim 7 wherein said source means comprises a semiconductor laser.

9. The optical detection system in accordance with claim 7 wherein said sensors are responsive to infrared radiation.

10. The optical detection system in accordance with claim 9 wherein said sensors comprise mercury cadmium telluride photodiodes.

11. The optical detection system in accordance with claim 7 wherein said first-mentioned coupling means and said second-mentioned coupling means include integrated optical waveguides.

12. The optical detection system in accordance with claim 7 wherein said modulating means provides a pair of differentially divided optical outputs, and wherein said detector means comprises a differential optical receiver.

13. The optical detection system in accordance with claim 7 wherein said modulating means includes integrated optical waveguides.

14. The optical detection system in accordance with claim 7 further including:
   means in said cryogenically cooled region coupled to said multiplexing means for generating control signals thereto;
   second modulating means in said cryogenically cooled region and responsive to a control signal for modulating optical power, said first-mentioned means coupling said optical power to said second modulating means;

second detector means in said ambient temperature region for generating an electric signal indicative of detected optical power; and means for coupling modulated optical power from said second modulating means to said second detector means.

* * * * *